(12) United States Patent
Aull et al.

(10) Patent No.: US 7,028,180 B1
(45) Date of Patent: Apr. 11, 2006

(54) SYSTEM AND METHOD FOR USAGE OF A ROLE CERTIFICATE IN ENCRYPTION AND AS A SEAL, DIGITAL STAMP, AND SIGNATURE

(75) Inventors: Kenneth W. Aull, Fairfax, VA (US); Vincent J. McCullough, Chantilly, VA (US); James I. Northrup, Sterling, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1025 days.

(21) Appl. No.: 09/690,544

(22) Filed: Oct. 16, 2000

Related U.S. Application Data

(60) Provisional application No. 60/210,462, filed on Jun. 9, 2000, provisional application No. 60/210,552, filed on Jun. 9, 2000, provisional application No. 60/229,336, filed on Sep. 1, 2000.

(51) Int. Cl.
*H04L 9/00* (2006.01)

(52) U.S. Cl. .................................... 713/156; 713/175

(58) Field of Classification Search ................ 713/156, 713/176, 180, 175, 163; 380/30
See application file for complete search history.

(56) References Cited

U.S. PATENT DOCUMENTS

| | | | | |
|---|---|---|---|---|
| 5,659,616 A * | 8/1997 | Sudia | ........................... | 705/76 |
| 6,035,402 A | 3/2000 | Vaeth et al. | | |
| 6,073,242 A | 6/2000 | Hardy et al. | | |
| 6,275,859 B1 * | 8/2001 | Wesley et al. | ............... | 709/229 |
| 6,301,658 B1 * | 10/2001 | Koehler | ....................... | 713/155 |
| 6,308,277 B1 * | 10/2001 | Vaeth et al. | ................. | 713/201 |
| 6,438,691 B1 * | 8/2002 | Mao | ........................... | 713/176 |
| 6,487,658 B1 * | 11/2002 | Micali | ........................ | 713/158 |
| 6,675,296 B1 * | 1/2004 | Boeyen et al. | ............... | 713/156 |
| 6,813,714 B1 * | 11/2004 | Hardjono et al. | ........... | 713/201 |

FOREIGN PATENT DOCUMENTS

WO     WO 94/26044 A     11/1994

OTHER PUBLICATIONS

European Search Report for EP 01112854.3-1237; Search completed Nov. 4, 2004.

(Continued)

*Primary Examiner*—Gilberto Barron, Jr.
*Assistant Examiner*—Venkat Perungavoor
(74) *Attorney, Agent, or Firm*—Tarolli, Sundheim, Covell & Tummino L.L.P.

(57) ABSTRACT

A method and computer program in which a user (132) may access the registration web server for the purpose of creating and utilizing a role certificate. This role certificate has policies associated with it and may be utilized for both encryption and as a digital signature. Individuals in a group share the same role certificate and can sign on behalf of the group. Further, individuals may decrypt messages sent to the group or any member of the group which have been encrypted using the role certificate. This method and computer program utilizes a directory (108) to maintain a list of all role certificates, their respective role administrators and all members of the organization that may utilize them. A key recovery authority (114) is utilized to recover expired role certificates. A certificate authority (110) is utilized to create and delete these role certificates. Further, a registration authority (112) is utilized to add and remove a previously created role.

66 Claims, 9 Drawing Sheets

OTHER PUBLICATIONS

Jing-Jang Hwang, et al.: "*Access Control with Role Attribute Certificates*"; Computer Standards & Interfaces, Elsevier Sequoia. Lausanne, CH, vol. 22, No. 1, Mar. 2000, pp. 43-53, XP004199339 ISSN: 0920-5489 *abstract* *p. 43, left-hand column, line 1-p. 52, right-hand column, line 4; figures 2-4; table 4*.

Neuman B C Ed—"*Proxy-based Authorization and Accounting for Distributed Systems*"; Institute of Electrical and Electronics Engineers; Proceedings of the International Conference on Distributed Computing Systems. Pittsburgh, May 25-28, 1993, Los Alamitos, IEEE Comp. Soc. Press, US vol. CONF. 13, May 25, 1993, pp. 283-291, XP010095707 ISBN: 0-8186-3770-6 *p. 283, left-hand column, line 18-p. 286, left-hand column, line 24; figures 1,3* *p. 289, left-hand column, line1-line 32; Figure 6* *p. 290, left-hand column, line 9-right-hand column, last line*.

W. Ford, et al., RFC 2459, "Internet X.509 Public Key Infrastructure", pp. 1-101, Jan. 1999.

Gasser, M., et al.; "*The Digital Distributed System Security Architecture*"; Proceedings of the National Computer Security Conference, XXX, XXX, Oct. 1, 1989, pp. 305-319, XP002017714; *p. 316, line 21-p. 317, line 43*.

Denning, D.R., et al.: *Taxonomy for Key Escrow Encryption Systems*; Communications of the Association for Computing Machinery, Association for Computing Machinery, New York, US, vol. 39, No. 3, Mar. 1, 1996, pp. 34-40, XP000676295 ISSN: 0001-0782; *p. 34, left-hand column, line 1-p. 39, left-hand column, line 21*.

European Search Report for EP 01 11 2854 completed Jan. 24, 2005.

* cited by examiner

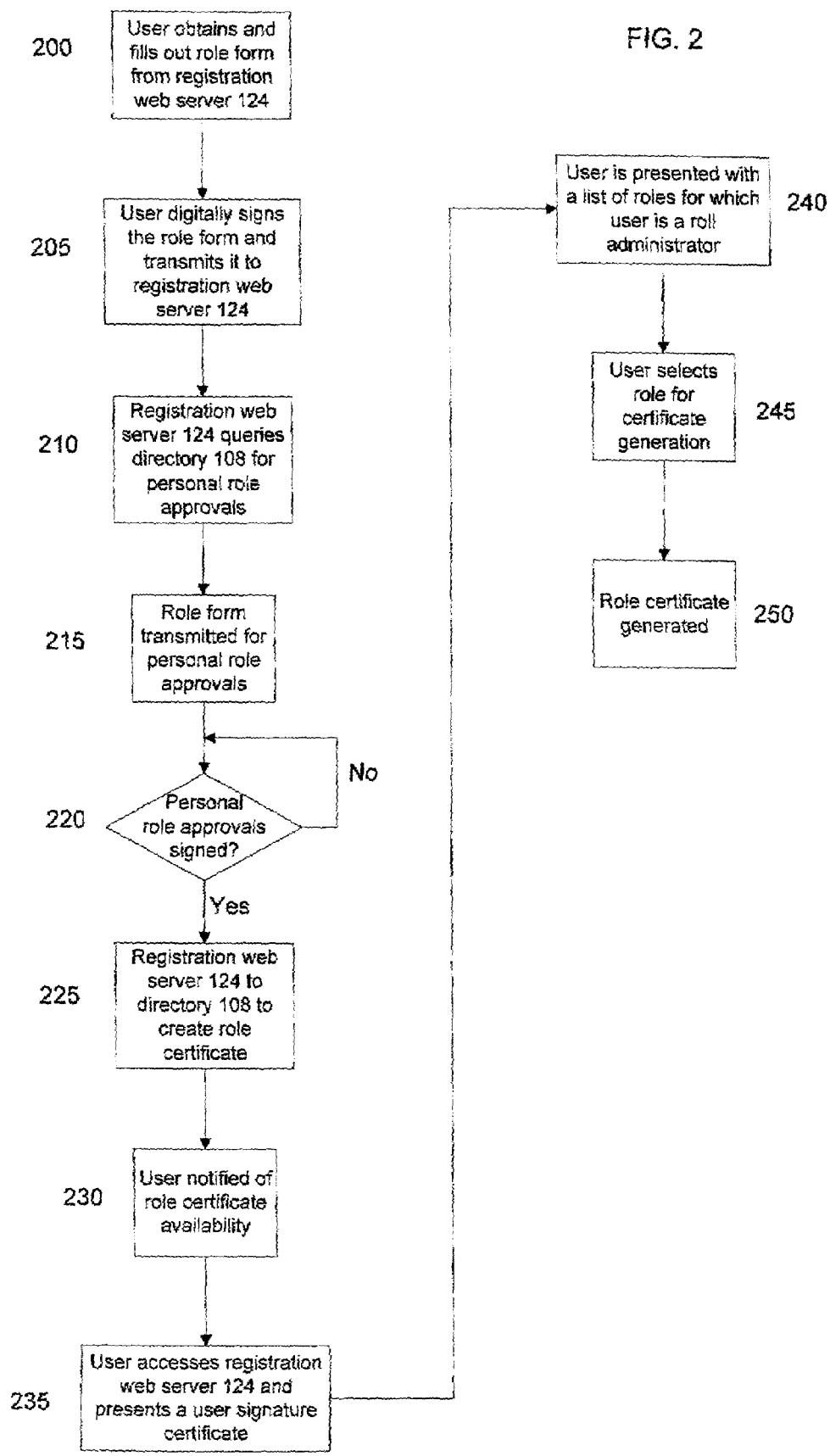

SYSTEM AND METHOD FOR USAGE OF A ROLE CERTIFICATE IN ENCRYPTION AND AS A SEAL, DIGITAL STAMP, AND SIGNATURE

CROSS-REFERENCE TO RELATED APPLICATIONS

This application claims the benefit of U.S. Provisional Application No. 60/210,462, filed Jun. 9, 2000, U.S. Provisional Application No. 60/210,552, filed Jun. 9, 2000, and U.S. Provisional Application No. 60/229,336, filed Sep. 1, 2000, the contents of which are expressly incorporated by reference herein.

BACKGROUND OF THE INVENTION

1. Field of the Invention

The invention relates to a system and method for usage of a role certificate in encryption, and as a seal, digital stamp, and a signature. More particularly, the invention employs a method and computer program in which a role certificate enables more than one individual or entity of an identifiable group to encrypt and decrypt information as well as sign, stamp, or seal any information using the same role certificate.

2. Background

For centuries individuals, governments, and business entities have searched for mechanisms and techniques whereby sensitive information may be transmitted to authorized parties over long distances and still remain secure. The problem faced by the foregoing entities is how information can be sent to the individual or entities that require it and still be assured that unauthorized parties may not be able to comprehend the transmitted information should they intercept it. Early methods of securing information have employed scrambling techniques, lookup tables, substitution ciphers, and code books in which letters or terms would be substituted for the original letters and terms in the information. These techniques frequently required that both the sender and receiver of information have access to the same "code book". One danger in such a technique is that the code book could fall into unauthorized hands.

In the early twentieth century, and particular during World War II, code books were replaced by electromechanical cipher machines. Both the sender and receiver would have an identical cipher machine used to encrypt and decrypt messages sent. In order to make it more difficult to decrypt these messages, the cipher machines have the ability to change the cipher used in a message or change the cipher used for every few words within a message. In order to accomplish this, the cipher machine would need to know the initial state or key utilized to encrypt the message.

In recent years, the cipher machines have been replaced by digital encryption algorithms in which both the sender and receiver have an identical copy of the digital encryption algorithm and a common key used to encrypt and decrypt messages. Both the encryption algorithm and key are held secret by both the sender and receiver.

More recently, another encryption technique has been developed in which two separate keys are used for encryption and decryption. A public key is transmitted freely to whoever requires it and is used to encrypt messages for a particular receiver. The receiver would have an associated private key which may be used to decrypt the message encrypted with the associated public key. For each public key there is only one private key and for each private key there is only one public key. When sending a message to several recipients, it is necessary to have each recipient's public key. The message would then be separately encrypted using each recipient's public key and transmitted to that particular recipient. Therefore, if ten separate entities are to receive the same message, then separate messages would be transmitted with each message encrypted with the individual's public key. With the advent of the Internet, such a public key infrastructure has gained significant acceptance as discussed in request for comments number 2459, by Ford et al., entitled "Internet X.509 Public Key Infrastructure", herein incorporated in its entirety by reference.

In addition to the need for the encryption and decryption of messages with the advent of electronic mail and the Internet, a need has developed for a secure mechanism to indicate approval and acceptance by an individual. In the past, an individual would typically show his approval or acceptance of such items as a contract or an order via a handwritten signature, a stamp, or a seal which would only be held by that individual. Anyone else that attempted to imitate such a signature, stamp, or seal would be subject to criminal penalties. With the advent of electronic mail and the Internet, a need has arisen to take advantage of the ease and speed of electronic mail to indicate, by a person or entity with proper authority, approval or acceptance of a contract or purchase. This has come to be known as a digital signature in which an individual may digitally sign a document.

This digital signature capability has been implemented using the same public key infrastructure previously discussed. However, instead of an entire document being encrypted, the document itself is passed through a one-way hashing algorithm that produces a small document, referred to as a digest. This digest is then encrypted using the individual's private key, also known as a private signing key, and is appended to the document. The receiver of the document can verify the authenticity of the digital signature (digest) by stripping the signature from the document and recomputing the hash function on the document to generate an as received digest. Using a public signing key, included in the document or previously received, it is possible to decrypt the digest of the document and compare it to the digest as received. If the two digests match, then the signature is authenticated. Therefore, in using the aforementioned public key infrastructure, it is possible to both encrypt and decrypt messages as well as digitally sign documents.

However, in the aforementioned public key infrastructure, in order for a group of individuals or entities to transmit and receive the encrypted messages each individual must have created a key pair having a public key and a private key. Further, each individual or entity in a group is also required to have separate public and private signing keys in order to digitally sign documents. In order for other members of the group to be able to decrypt messages received, it is necessary for members of the group to exchange key pairs including the private key. This may be necessary when a member of the group is not in the office due to illness or travel. Where such an exchange of key pairs does not take place, when an urgent encrypted message comes into, for example, the office of finance, human resources, or an engineering group in the corporation, only the person holding the private key may decrypt the message. When the person is unavailable, that message will not be decrypted and a prompt response will not be received by the sender. However, when key pairs are exchanged by members of a group, then all members who possess an individual's private key may decrypt all messages sent to that person, regardless of the nature of the message or its sensitivity. This creates significant problems for businesses that need to respond quickly to customer requests and in which customer confidences must be maintained. This may most acutely be seen in law offices, medical offices, and the military where delay in delivering a response may be very costly. Further, it is cumbersome for a large group of individuals or entities to exchange key pairs with one another. For example, where a group contains 30 individuals, a total of 30 times 30, or 900 exchanges of key pairs must take place in order for anyone in the group to be able to decrypt any message received by any other member of the group.

Regarding the exchange of private signing keys, it is to be noted that a similar need exists for members of a group to be able to sign documents on behalf of the group in certain instances. For example, the office of financial affairs for a corporation receives requests for approval of purchasing orders. Such purchasing orders may be for items which are frequently required by the corporation and for which funds have been allocated. However, it should not be necessary for the chief financial officer to approve each and every transaction. Further, the disbursement of private signature keys to all members of the office of finance for the corporation may be very unwise. What this means is that a low-level purchasing officer may approve large expenditures using the vice president of finance's private signature key. In addition, this invites and perhaps even encourages fraud and embezzlement.

Further, when an organization maintains separate key pairs for both encryption and signature purposes, this further adds to the complexity of maintaining and disbursing private keys for both encryption and signatures. Ideally, a single digital certificate should be used for both encryption and signature purposes by all authorized members of a group. In addition, policies should be established to indicate the limitations associated with a group digital signature. For example, a policy for purchase approval on a digital signature from the office of finance in a corporation may be limited to purchases of no greater than $100,000. Beyond this limit a personal signature of the chief financial officer is required to approve such a purchase. In addition, this policy should be publicly available, at least within the organization, so that others may verify that the digital signature issued by a group is valid under the policy.

Therefore, what is needed is a method and computer program in which digital "role" certificates may be used for both encryption and signature purposes for a group. The possession of such a role certificate, by an authorized member of a group issuing the role certificate, should enable that person to decrypt messages sent to others within the group that were encrypted using the digital certificate. Further, this method and computer program should enable authorized members of a group to sign on behalf of the group within limits set by publicly available policies. Still further, this system and computer program should create processes that allow the creation and receipt of role certificates to be used as an organizational stamp and for organizational encryption. This system and computer program should contain procedures for replacement of such a role certificate, revocation of a role certificate, recovery of a role certificate, terminating of roles, and recovery of terminated roles.

SUMMARY OF THE INVENTION

An embodiment of the present invention provides for a method of creating a role certificate by a user. This method begins by transmitting a role approval form filled out and digitally signed by the user using a personal digital signature to at least one personal role approval. The role approval form is digitally signed by the personal role approval using a personal digital signature. The role certificate is created upon receipt of the role approval form signed by the user and all personal role approvals. The user is notified of the availability of the role certificate. Then the role certificate is transmitted to the user.

Further, an embodiment of the present invention is a method of using a role certificate as an organizational encryption by several role members of a group. This begins by a role member filling out an electronic form. The role member then digitally signs the electronic form by the role member using the role certificate. The role member also digitally signs the electronic form by the role member using a personal signature certificate. Thereafter, the electronic form is transmitted to an entity.

A still further embodiment of the present invention is a method of replacing an expiring role certificate. A list of roles is displayed to a user who is either a role member or a role administrator. The user is a member of a group authorized to utilize the role certificate as a group stamp and for encryption which may be decrypted by any group members. A role is selected which is about to expire for renewal by the user. It is then determined if the user is authorized to renew the role based upon verification of the user's personal digital signature. A new role certificate is generated having a private and public key pair. The new role certificate is then transmitted to the user.

A still further embodiment of the present invention is a method of revoking a role certificate used as an organizational stamp and for organizational encryption by authorized members of the organization. This method begins by transmitting a signature certificate to a registration web server by a user. The registration web server then authenticates the user is still a member of the organization by accessing a directory. Roles are then listed of which the user is a role member or a role authority. Finally, the role certificate associated with the role is removed from the directory database.

Another embodiment of the present invention is a method of recovery of an expired role certificate associated with the role used for organizational encryption and as an organizational stamp. A request is transmitted to recover the expired role certificate along with a digital signature from a role member. A role member is an entity having a right to digitally sign organizational documents using the role certificate and decryption information sent to members of the organization which has been encrypted using the role certificate. A list of all roles that the role member is listed as a role member on is provided. The role member selects the expired role certificate from the list of roles for recovery. A key recovery authority is contacted for a copy of the role certificate. The role certificate is transmitted to the role member.

Another embodiment of the present invention is a method of revoking a role certificate and an associated role by a role administrator. This method begins by transmitting a request to revoke the role certificate and the associated role by the role administrator for the role certificate along with a signature certificate for the role administrator. A database is searched for all role certificates in which the role administrator is listed as a role administrator. The list is then displayed to the role administrator of all role certificates discovered. The role administrator then selects a role certificate to be removed. Both the role certificate and the role are deleted from the database.

A still further embodiment of the present invention is a method of recovering a former role and an associated role certificate by a role administrator. This method entails identifying a role certificate to be recovered searching a database to determine if any role members associated with the role certificate are still with the organization, and transmitting to at least one recovery agent a request for approval for the recovery of the role certificate when no role members are discovered to be in the organization. The method also includes receiving approval from the at least one recovery agent for recovery of the role certificate and transmitting to the at least one recovery agent the role certificate retrieved when approved by the recovery agent. Then, the role certificate is transmitted to the role administrator by the recovery agent.

These and other features of this system, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 2 is a flowchart of an example embodiment of the process for obtaining a role certificate in the present invention;

DETAILED DESCRIPTION

Figure 1:
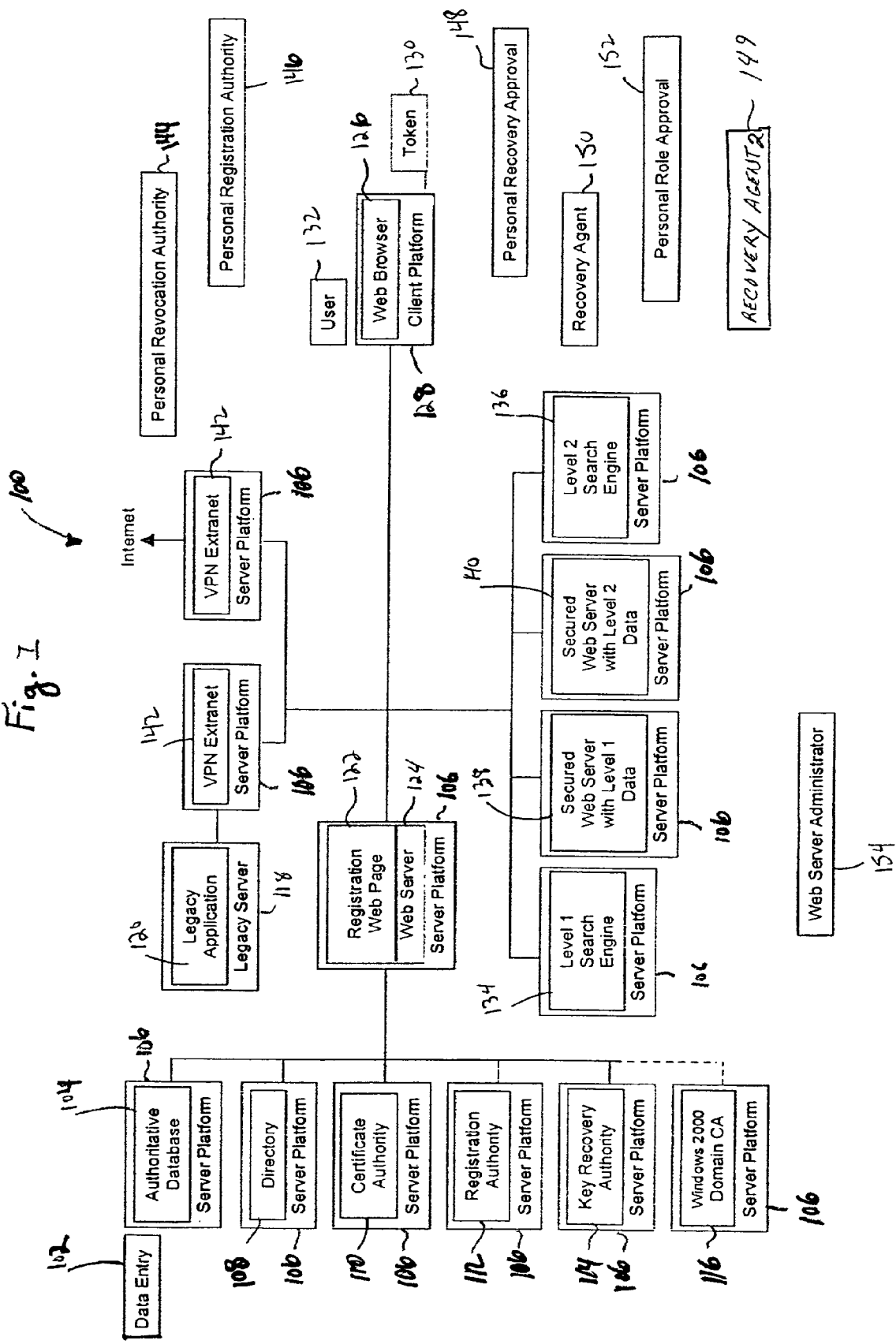
FIG. 1 is a module configuration of the software, firmware, and hardware used in the embodiments of the present invention.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

Before entering into a discussion of the flowcharts a brief discussion of the nature and function and structure of a role certificate is necessary. As will become apparent from review of FIGS. 2 through 9, the embodiments of the present invention rely on the usage of a role certificate. A role certificate is based on an X.509 certificate (V3) discussed in detail in item 4 of RFC 2459, previously incorporated herein by reference. The X.509 certificate is a public key certificate utilized for either encryption purposes or as a signature key. The information contained in the X.509 certificate will vary according to whether it is set up as a signature certificate or as a public key for encryption. The role certificate contains at least those fields shown in table 1 ahead.

TABLE 1

| X.509 (V3) Certificate |
| --- |
| Version (V3) |
| Serial Number |
| Signature Algorithm ID |
| Issuer Name |
| Validity Period |
| Subject Name |
| Subject Public Key Information |
| Issuer Unique Identifier |
| Subject Unique Identifier |
| Extensions |

The role certificate is distinguished from an individual user's X.509 certificate (V3) in three ways. First, the name of the role certificate may distinguish it as a role certificate. Second, bits in the extension field, illustrated in Table 1, would be set to indicate that the role certificate may be used for both encryption and signature purposes. Third, policies may be associated with a role certificate to indicate limitations on the uses of the role certificate. These policies may be stored on the registration web server 124 accessible by user 132, shown in FIG. 1, who receives a signature associated with an office. For example, a role certificate may be issued by the office of finance within the corporation to approve a purchase request. However, since several individuals within the office of finance may issue such a role certificate as a signature, that role certificate may have a dollar limitation policy associated with it, such as not valid for more than $100,000, for which the role certificate is valid. Anything above the dollar limitation would require the individual signature certificate of the chief financial officer in order to be considered valid. Other limitations may be associated for a role certificate on an individual basis.

Therefore, a role certificate may be distinguished from a X.509 (v3) certificate by any one or a combination of the naming convention used for the role certificate, policies associated with the role certificate that limit its use, the ability to use the role certificate for both encryption and as a digital signature by setting bits in the extensions, as well as its use by a group of individuals for encryption, decryption, and as a group signature.

FIG. 1 is a module configuration diagram of the software, firmware, and hardware used in the embodiments of the resent invention. The blocks illustrated in FIG. 1 represent modules, code, code segments, commands, firmware, hardware, instructions and data that are executable by a processor-based system(s) and may be written in a programming language, such as, but not limited to, C++. It should be noted that the modules depicted in FIG. 1 are shown as contained in separate server platforms. However, these modules are not limited to residing on separate servers and may reside and execute on one computer or any number of computers depending on the number of users the system must handle and the communications involved. FIGS. 2 through 9 are flowcharts further detailing the operations executed by the modules shown in FIG. 1.

FIG. 1 illustrates an exemplary architecture 100 in which the Public Key Infrastructure (PKI) processes of the present invention may be practiced. However, as previously discussed, it should be understood that the present invention is not limited to the architecture 100 of FIG. 1. The architecture 100 includes data entry 102 which performs a data entry function for authoritative database 104 which is any particular server architecture. The server platform 106 may be without limitation UNIX or Windows NT servers. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification etc., of the members of the group or enterprise. Directory 108 has the structure of the database but is optimized for fast look-up information stored therein rather than fast data entry. The data in the directory 108 is not changed frequently, but is required to be accessed rapidly and functions on-line as a fast phone book containing reference information about the members of the group or enterprise stored in the authoritative database 104. Certificate authority 110 is a conventional off-the-shelf software executed on server platform 106 providing storage of certificates and related information used by the present invention as described in more detail hereinafter. Registration authority 112 is also off-the-shelf software executable on server platform 106 regarding registration performed by the present invention as described in more detail hereinafter. Key authority 114 is also off-the-shelf server software which is executable on server platform 106 for recovering keys from members of the group or enterprise as described in more detail hereinafter. Windows 2000 domain CA 116 may use certificates provided by the present invention for a single sing-on to the architecture of FIG. 1. Legacy server 118 executes legacy application programs 120. The legacy server may be, without limitation, a main frame, mini-computer, workstation or other server hosting legacy software applications that are designed to be run on PKI processes in accordance with the present invention. The legacy applications 120 are accessible on the client side by a customer client 128 such as an emulator or custom database Graphic User Interface (GUI). Examples of emulators are terminal emulators of an IBM 3270 or terminal emulators of a vt 100. Registration web page 122, which may be one or more pages, functions as the user interface to the architecture 100 of FIG. 1. Web server 124 is a software application which serves web pages such as web page 122 or other HTML outputs to a web browser client which may be without limitation Apache or a Microsoft Internet Information Server. Web browser 126 is resident on client platform 128 which may be any user computer. Web browser 126 is a client software application for browsing web pages such as but not limited to HTML or XML protocols or other protocols. The Web browser 126 is programmed to operate with PKI certificates issued by the certificate authority 110. Examples of web browsers which have this capability are Netscape Navigator and the Microsoft Internet Explorer. The token 130 is a smart card, USB (Universal Serial Bus) or other hardware token capable of generating, storing, and using PKI certificates. A user 132 is a person using the architecture 100. A user 132 transitions through a number of states which include a new user, current user, and a former user who no longer is a member of the group or enterprise. The architecture 100 is described with reference to two levels of security but the number of the levels of security is not a limitation of the present invention, with each level corresponding to a different security requirement. The level 1 search engine 134 is a search engine which is permitted to search through the architecture 100 but is allowed access to only level 1 data, which is the lowest level of security and may be without limitation data which is freely distributable. Level 2 data may be considered to be proprietary. Level 2 search engine 136 is a search engine which is allowed to search through both level 1 and level 2 data. A level N search engine (not illustrated) is a search engine which is allowed to search through servers possessing levels 1 through N of data. A secured level server with level 1 data is a web server containing only level 1 data which is secured so that users may have access to level 1 servers. A secured web server with lever 2 data 140 is a web server that contains level 2 data which has been secured so that users must have level 2 access with level 2 users having access to both level 1 and level 2 servers. A secured web server with level N data (not illustrated) is a web sever that contains level N data which is accessible by a user with level N or above access to all levels of data up through level N access. VPN Extranet 142 is a software application which functions as a network gateway, which as illustrated, may be either to legacy server 118 and legacy application 120 or to an external network such as the Internet. Personal registration authority 144 is a person who is in charge of revocation of members from the network 100. Personal registration authority 146 is a person who is in charge of registration of members in the network 100. Personal recovery approval 1 148 and recovery agent 2 149 are persons responsible for obtaining recovery of certificates. A recovery agent 1 150 is a person who performs recovery of certificates and may only recover a certificate if the certificate has first been designated as recoverable by another person. Personal role approval 152 is a person who approves different role functions within the network 100. A web server administrator is in charge of various web functions in the network 100.

FIG. 2 is a flowchart of an example embodiment in the present invention where a role certificate is created for user 132. The user 132 requesting the role certificate will be designated as the role administrator and determines what other users would be added and deleted as role members. Therefore, the role administrator is considered to be the owner of the role certificate. Other designated users may employ the role certificate for encryption purposes and signature purposes for the office of which they are members. However, only the role administrator may add or delete members as well as revoke, create, or recover the role certificate.

Still referring to FIG. 2, the process for creating a role certificate begins in operation 200 where the user 132 via his local client platform 128 accesses the registration web server 124 and fills out an electronic form requesting the role certificate. In operation 205 the user digitally signs the electronic role form and transmits it to the registration web server 124. Thereafter, in operation 210, the registration web server 124 queries directory 108 for personal role approvals. This personal role approval will vary depending on the enterprise's policy. For example, this may simply entail sending the electronic form to the user's manager for his signature approval. However, this may also entail sending the electronic form to security or human resources for their signature approval. In any case the user's authority to generate a role certificate would have to be verified.

Still referring to FIG. 2, upon receipt by the registration web server 124 of the e-mail addresses of the personnel role approval parties from the directory 108, the electronic form filled out by the user is transmitted to those personal role approval (148 and 152) parties, in operation 215. Thereafter, in operation 220, processing related to acquisition of a role certificate ceases until all personal role approval parties have responded by digitally signing the electronic form and returning it to the registration web server 124. In operation 225, upon receipt of all digitally signed electronic forms from all personal role approval (148 and 152) entities, the registration web server 124 transmits a request to directory 108 to generate a role certificate on behalf of user 132 for the role specified in the electronic form. Thereafter, in operation 230, the registration web server 124 notifies the user 132 of the availability of the role certificate. In operation 235, the user 132 accesses the registration web server 124 and provides a user signature certificate so that the registration web server 124 may verify the user's identity. Once the user's identity is verified, processing proceeds to operation 240 where the user 132 is presented with a list of roles for which the user 132 is a role administrator. In operation 245, the user 132 selects the role certificate desired and thereafter, in operation 250, the role certificate is generated and transmitted to the user 132. It should be noted that the communications between the user 132 and the registration web server 124 may be encrypted so that an unauthorized third party may not utilize a role certificate even if access to client platform 128 were accomplished.

Figures 3A, 3B:
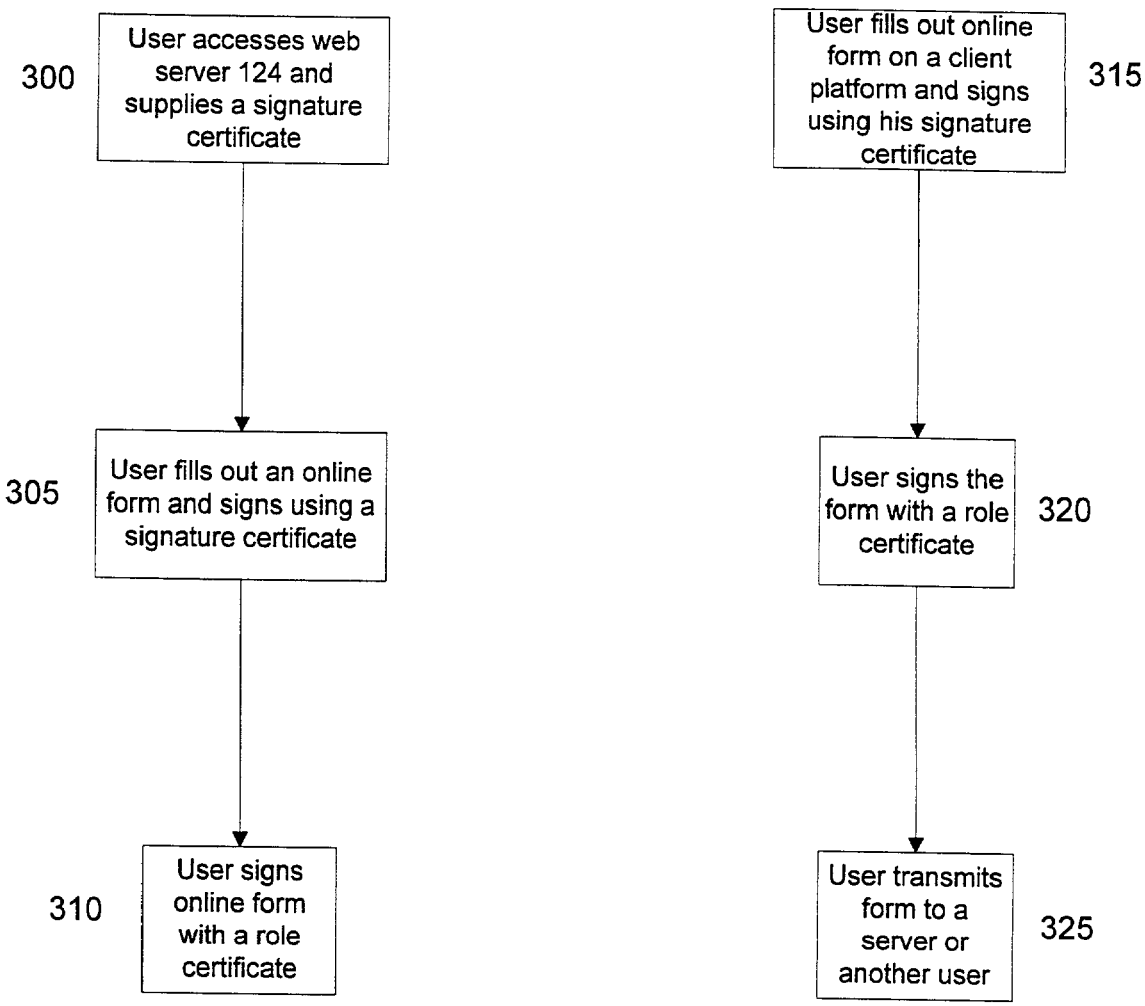
FIG. 3A is a flowchart of an example embodiment of the process for using a role certificate as an organizational stamp on a form in a web server in the present invention.
FIG. 3B is a flowchart of an example embodiment of the process for using a role certificate as an organizational stamp on a form in an e-mail in the present invention.

FIG. 3A is a flowchart of an example embodiment of the process for using a role certificate as an organizational stamp on a form or in a web server in the present invention. One of the benefits of a role certificate is that it acts as an organizational stamp indicating that an authorized individual is acting on behalf of the organization. In FIG. 3A, the process shown allows the user to sign an electronic form on a web site which may be a purchase order and the user of the role certificate indicates approval by the organization for the purchase. Once the user 132 has acquired a role certificate, as outlined in the process shown in FIG. 2, in operation 300 the user 132 may access a web server. The web server may require the user to supply a signature certificate in order to gain access in operation 300. In operation 305, the user 132 signs the electronic form using his signature certificate. Thereafter, in operation 310 the user 132 signs the electronic form with the role certificate. Utilizing this process the user 132 is able to act on behalf of the organization and simultaneously identify himself thereby reducing the possibility of misuse of the role certificate.

FIG. 3B is a flow chart of an example embodiment of the process for using a role certificate as an organizational stamp on a form in an e-mail in the present invention. As with the process illustrated in FIG. 3A, user 132 will be signing a form utilizing both his personal digital signature and the role certificate on behalf of the organization. However, in this case the user 132 will be transmitting the electronic form to another server or to another user. This process begins in operation 315 with the user filling out an electronic form on the client platform 128 and signing the form using his personal digital signature. Thereafter, in operation 320 the user 132 signs the electronic form using the role certificate. In operation 325, user 132 then transmits this form to either another server or another user.

Figures 4A, 4B:
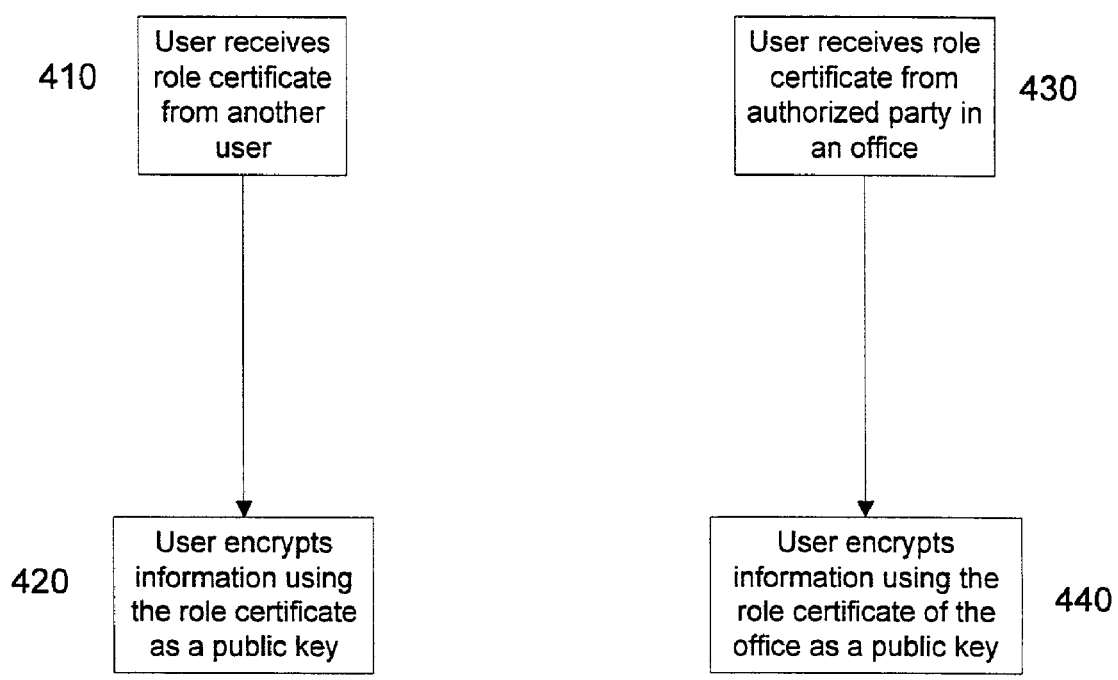
FIG. 4A is a flowchart of an example embodiment of the process for using a role certificate for organizational encryption in the receiving and sending of information in the present invention.
FIG. 4B is a flowchart of an example embodiment of the process for using a role certificate for organizational encryption in the receiving and sending of information in the present invention.

FIG. 4A is a flowchart of an example embodiment of the process for using a role certificate for organizational encryption in the receiving and sending of information in the present invention. Up to this point role certificates have been discussed only in relation to their use as signature certificates. However, as previously discussed, since the extensions fields of the role certificate are set for both encryption and signature, the same role certificate may be used for both purposes. In the process illustrated in FIG. 4A a user 132 receives a role certificate from another user in operation 410. In operation 420 that user 132 may now encrypt messages utilizing the role certificate as an encryption (public) key and transmit them to anyone listed in directory 108 as having access to the role certificate. Anyone within the organization or group having been issued the role certificate will be able to decrypt and read the message. Further, depending on the organizational structure, encrypted messages may be sent to a common mail box for an organization and may be opened by anyone in the organization that is an authorized member of the organization as established by the role administrator.

FIG. 4B is a flowchart of an example embodiment of the process for using a role certificate for organizational encryption in the receiving and sending of information in the present invention. The process illustrated by FIG. 4B involves receiving the role certificate from the role administrator by a person in the organization who is designated as a role member. In operation 430, the user 132 receives a role certificate from the role administrator. Thereafter, user 132 encrypts messages and sends them to other members of the group or organization. Further, user 132 may transmit the role certificate to others that may use it to transmit encrypted messages to user 132. In this manner messages may be encrypted and sent and received and decrypted by individuals designated as role members.

Figure 5:
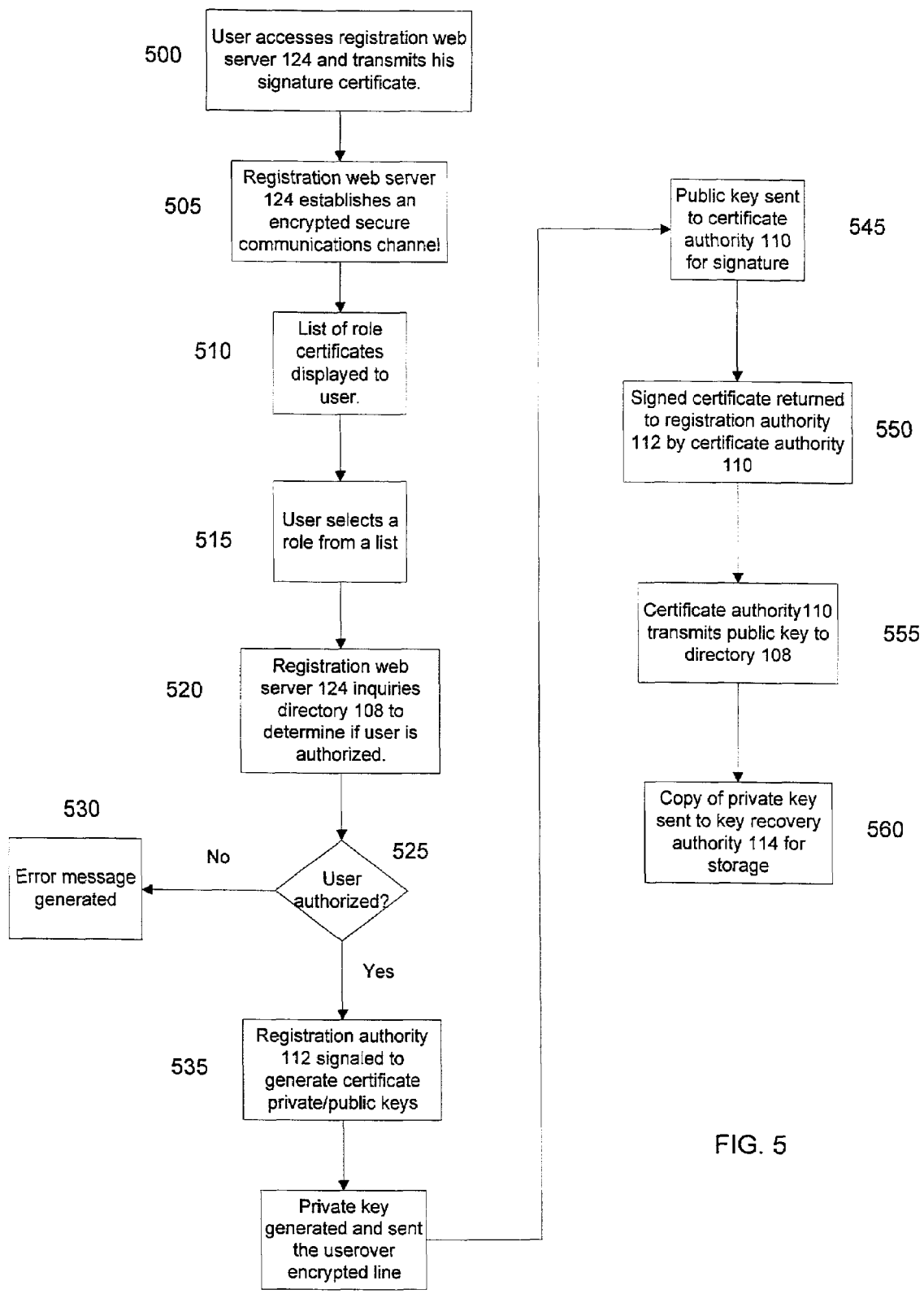
FIG. 5 is a flowchart of an example embodiment of the process for replacing an expiring role certificate in the present invention.

FIG. 5 is a flowchart of an example embodiment of the process for replacing an expiring role certificate in the present invention. The role administrator may optionally designate in the process illustrated in FIG. 2 that the role certificate created is valid for a particular period of time. Via this mechanism, a role administrator can ensure that an old role certificate may not be used after a particular time period and is forced to review the role member list to determine if they should continue to be role members.

Processing begins in FIG. 5 in operation 500 where user 132 accesses registration web server 124 and transmits his signature certificate as an irrefutable means of identification. In operation 505, the registration web server 124 establishes an encrypted secure communications channel with user 132. This is done to insure that an unauthorized party may not intercept the private key portion of the role certificate. In operation 510, a list of role certificates of which the user 132 is a role administrator is displayed to user 132. In operation 515, the user 132 selects a role from the list displayed. Thereafter, in operation 520 registration web server 124 queries a directory 108 to determine if user 132 is authorized as role administrator for the role selected. In operation 525, if user 132 is not authorized as a role administrator for this particular role then processing proceeds to operation 530 where an error message is generated and execution ceases. However, if in operation 525 it is determined that user 132 is an authorized user administrator, then processing proceeds to operation 535. In operation 535 a registration authority 112 is signaled to generate a new role certificate for this particular role which would include both a private and public key and setting of extension bits to indicate that the role certificate may be used for both encryption and signature. Processing then proceeds to operation 540 where the private key is generated and sent to user 132 from the registration authority 112 via registration web server 124. As would be appreciated by one of ordinary skill in the art, communications may occur directly between user 132 and the registration authority 112. In operation 545, the public key portion of the role certificate is sent to the certificate authority 110 for approval indicated by a digital signature. Thereafter, in operation 550 the signed certificate is returned to registration authority 112 by the certificate authority 110. In operation 555, the certificate authority 555 transmits the public key to directory 108. In addition, in operation 560 a copy of the private key is sent to key recovery authority 114 for storage. In this process for replacement of an expiring role certificate, it is again possible to designate an expiration date for this replacement role certificate.

Figure 6:
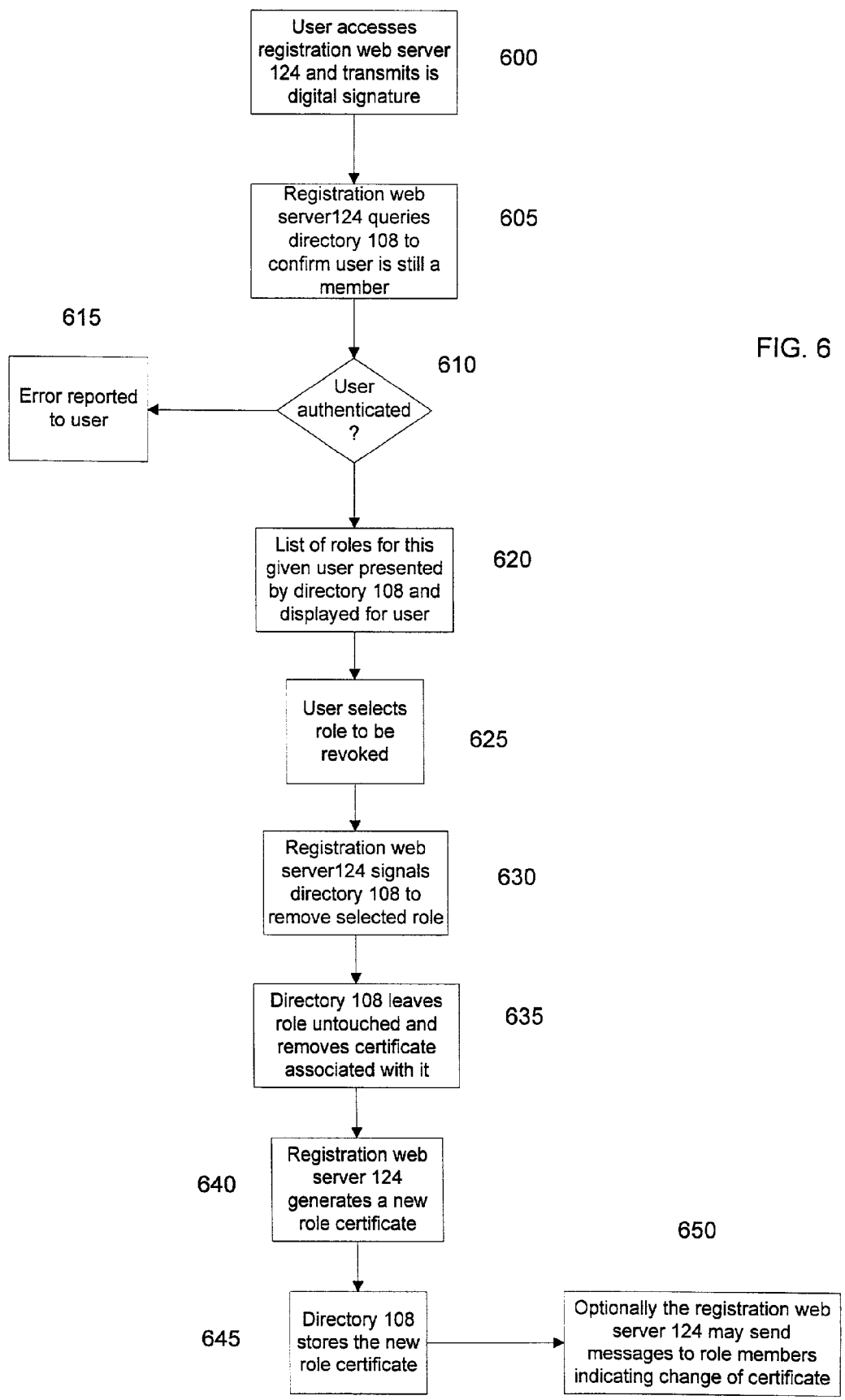
FIG. 6 is a flowchart of an example embodiment of the process for revoking a role certificate in the even of suspected compromise of the role certificate in the present invention.

FIG. 6 is a flowchart of an example embodiment of the process for revoking a role certificate in the event of suspected compromise of the role certificate. As with all signature and encryption systems it may be necessary to revoke a role certificate upon the mere suspicion that is compromised. This is accomplished by the operations shown in FIG. 6. Processing begins in FIG. 6 in operation 600 where the user 132 accesses the registration web server 124 and transmits a copy of his digital signature. In operation 605, registration web server 124 queries directory 108 to confirm that user 132 is still a valid member of this organization. In operation 610, if the user is no longer a member of the organization, processing proceeds to operation 615 where an error message is generated. However, if in operation 610 the user is determined to be a valid member of the organization, then processing proceeds to operation 620. In operation 620, the list of roles of which user 132 is a member is generated by directory 108 and transmitted to user 132 either directly or through registration web server 124. Thereafter, in operation 625, the user 132 selects a specific role to be revoked. In operation 635, the directory 108 will leave the role untouched in the database and remove the certificate associated with it. Processing then proceeds to operation 640 where the registration web server 124 generates a new role certificate. In operation 645 this new role certificate is transmitted to directory 108 which stores it in the database associated with the particular role. In operation 650 registration web server 124 may optionally send messages to the role members for this particular role to indicate that the role certificate has been replaced.

Figure 7:
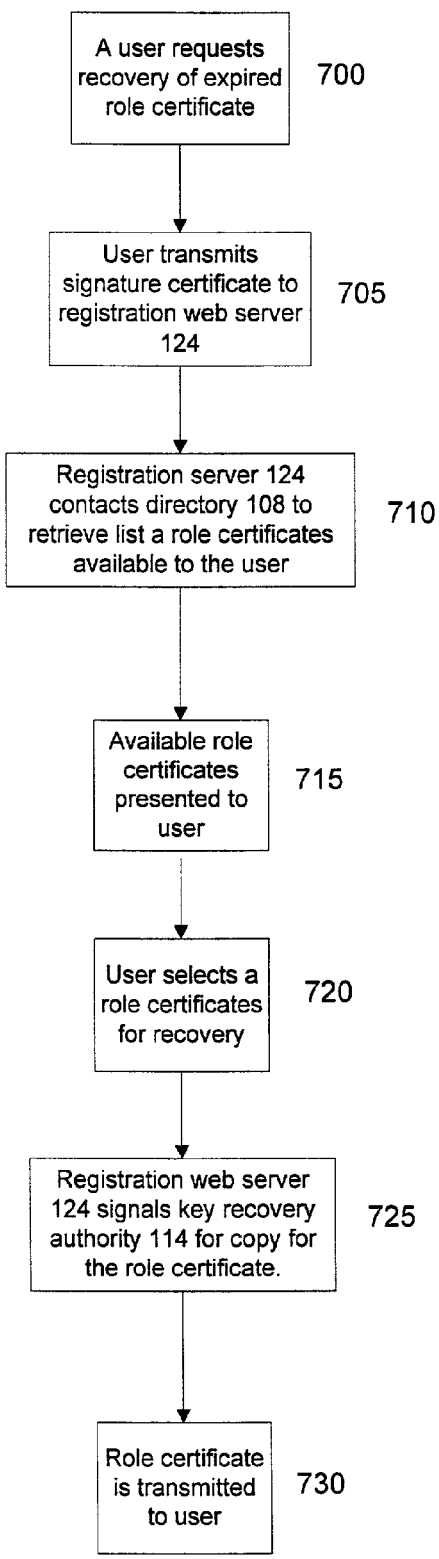
FIG. 7 is a flowchart of an example embodiment of the process for recovery of a role certificate in the present invention.

FIG. 7 is a flowchart of an example embodiment of the process for recovery of a role certificate in the present invention. There are two possible implementations of the process shown in FIG. 7. In the first, the role administrator may recover a lost role certificate for a particular user 132. In the second, the user 132 may of his own accord recover a lost role certificate. In either alternate embodiment, either the role administrator or user 132 would be required to supply his signature certificate to verify their identities. In addition, as previously discussed, it is preferred that an encrypted secure communications line be used in transmittal of the private key portion of the digital certificate.

The process illustrated in FIG. 7 begins in operation 700 in which a user 132 (either the role administrator or the user himself) requests from registration web server 124 recovery of a lost or expired role certificate. In operation 705, the user 132 transmits a copy of his signature certificate to registration web server 124. Thereafter, in operation 710, the registration web server 124 contacts directory 108 to retrieve a list of role certificates available to the user 132. In operation 715 all role certificates for which the user 132 is a member are sent to the registration web server 124 for display to the user 132. Processing then proceeds to operation 720 where the user 132 selects a role certificate for recovery. In operation 725, the registration web server 124 signals the key recovery authority 114 for a copy of the role certificate. In operation 730, either the role web server 124 or the key recovery authority 114 transmits the role certificate to user 132 over an encrypted and secure line.

Figure 8:
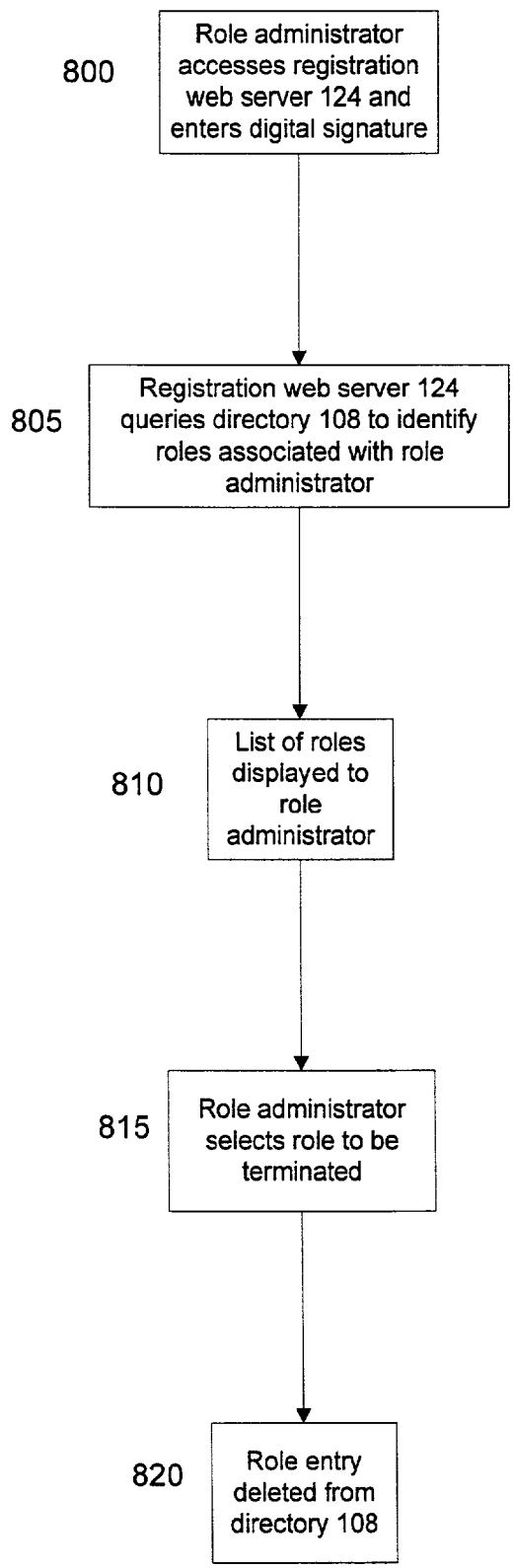
FIG. 8 is a flowchart of an example embodiment of the process for terminating a role in the present invention.

FIG. 8 is a flowchart of an example embodiment of the process for terminating a role in the present invention. Unlike the process illustrated in FIG. 6, the process illustrated in FIG. 8 revokes an entire role. The removal of a role can only be accomplished by a role administrator. Processing begins in operation 800 in which the role administrator accesses the registration web server 124 and enters his digital signature. In operation 805, the registration web server 124 queries directory 108 to identify roles associated with the role administrator. In operation 810, a list of roles is displayed for the role administrator. Thereafter, in operation 815, the role administrator selects a role to be terminated from the list presented. Thereafter, in operation 820, the role and the role certificate associated with it are deleted from the database.

Figure 9:
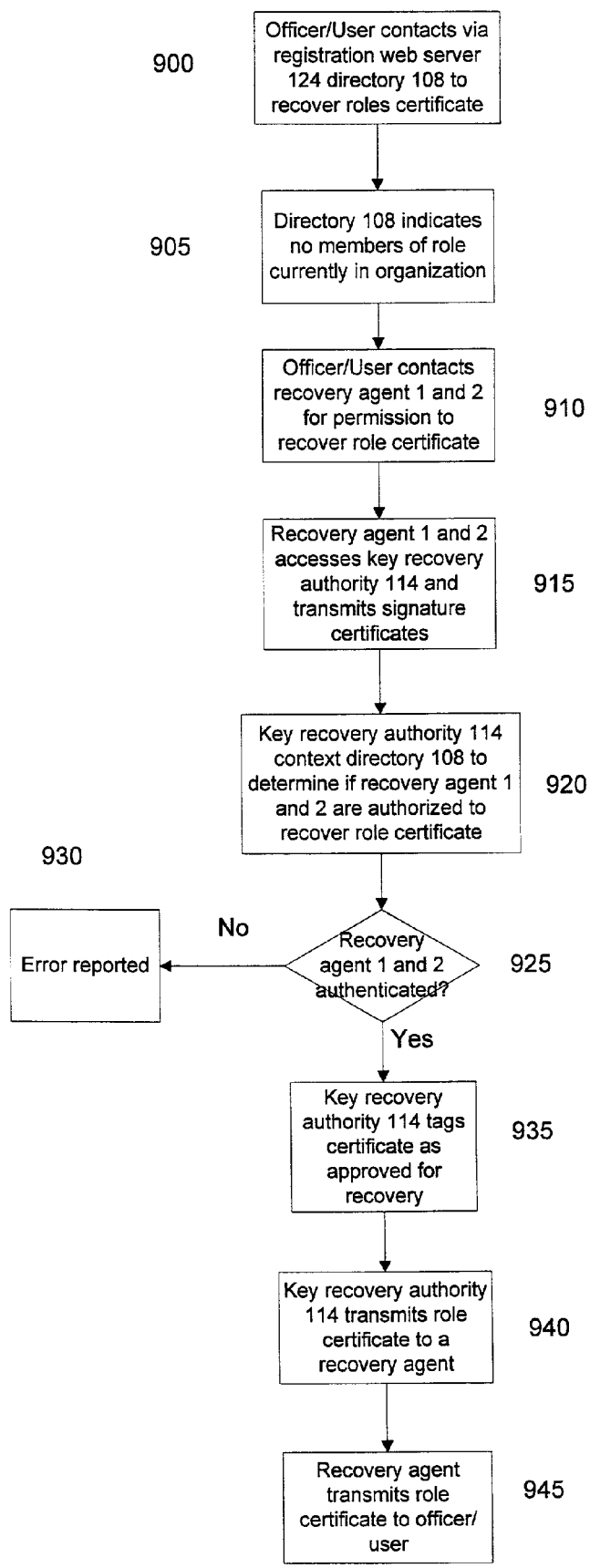
FIG. 9 is a flowchart of an example embodiment of the process for recovery of a role certificate in the present invention.

FIG. 9 is a flowchart of an example embodiment of the process for recovery of a role certificate in the present invention. The process illustrated in FIG. 9 is an alternate embodiment to that shown in FIG. 7. However, in the example embodiment shown in FIG. 9, two agents are utilized to recover a role certificate, thereby adding further security to the present invention. Processing begins execution in operation 900 where an officer or user 132 of the organization contacts, via the registration web server 124, directory 108 in order to recover a role certificate. In operation 905, the directory 108 indicates that no member of the role is currently in the organization. This would occur when a group is established to accomplish some function and then that group disbands upon the completion of that endeavor. However, encrypted messages are still being sent to this particular group. Thereafter, the officer of user 132 contacts recovery agent 1 150 and recovery agent 2 149 for permission to recover a role certificate. Assuming recovery agent 1 150 and recovery agent 2 149 both individually agree that the particular role certificate needs to be recovered, processing then proceeds to operation 915. In operation 915, both recovery agent 1 150 and recovery agent 2 149 independently access key recovery authority 114 requesting recovery of the role certificate and each supplying their digital signature. In operation 920, the key recovery authority 114 contacts directory 108 to determine if recovery agent 1 150 and recovery agent 2 149 are authorized to recover a role certificate. In operation 925, if either recovery agent 1 150 and recovery agent 2 149 are not authenticated, then processing proceeds to operation 935. In operation 935 the key recovery authority transmits the role certificate to a recovery agent, either recovery agent 1 150 or recovery agent 2 149. In operation 945, the recovery agent receiving the role certificate transmits the same to the officer of user 132.

Using the embodiments of the present invention, an organization may create processes and methods for managing role certificates. These role certificates would be utilized for both signature and encryption purposes. Further these role certificates would be used by several individuals within identifiable groups, thereby making possible an electronic stamp for a group or organization. Authorized members of the group would be able to sign on behalf of the group and decrypt messages sent to the group. Therefore, the organization will be able to better respond to customer needs while maintaining the security of important information.

While we have shown and described only a few examples herein, it is understood that numerous changes and modifications as known to those skilled in the art could be made to the present invention. For example, any type of computer architecture may be utilized for the embodiments of present invention. Further the present invention may be written in any general-purpose computer language. Also, security may be enhanced through the use of encrypted secure communications lines whenever a private key is transmitted over the network. Therefore, we do not wish to be limited to the details shown and described herein, but intend to cover all such changes and modifications as are encompassed by the scope of the appended claims.

The invention claimed is:

1. A method of creating a role certificate by a user, comprising:
   transmitting a role approval form, filled out and digitally signed by the user using a personal digital signature, to at least one personal role approval, wherein the user is a member of a group authorized to utilize the role certificate as a group stamp and for encryption of information which may be decrypted by a plurality of group members;
   signing digitally the role approval form by the personal role approval using a personal digital signature;
   creating a role certificate upon receipt of the role approval form signed by the user and the personal role approval;
   notifying the user of the availability of the role certificate; and
   transmitting the role certificate to the user.

2. The method recited in claim 1, wherein the role certificate comprises a public key, a private key, a signature algorithm ID, a validity period, extensions, and at least one policy.

3. The method recited in claim 2, wherein the policy indicates all permitted uses and limitations on the role certificate.

4. The method recited in claim 3, further comprising:
   identifying all members of a group as role members that will access and use of the role certificate;
   storing the names and identifications of all role members; and
   transmitting copies of the role certificate to all role members.

5. The method recited in claim 4, further comprising:
   transmitting the public key portion of the role certificate to a plurality of entities outside the group; and
   decrypting messages from the plurality of entities outside the group encrypted using the public key portion of the role certificate.

6. The method recited in claim 4, further comprising:
   signing electronic forms by a group member utilizing the role certificate; and
   transmitting electronic forms to entities outside the group.

7. A method of using a role certificate as an organizational stamp and for organizational encryption by a plurality of role members of a group, comprising:
   filling out an electronic form by a role member of the plurality of role members of the group, wherein the role member is a member of a group authorized to utilize the role certificate as a group stamp and for encryption of information which may be decrypted by a plurality of group members;
   signing digitally the electronic form by the role member using the role certificate;
   signing digitally the electronic form by the role member using a personal signature certificate; and
   transmitting the electronic form to an entity.

8. The method recited in claim 7, further comprising:
   retrieving a policy associated with the role certificate by the entity; and
   determining if the role certificate signature supplied is valid as a signature for the electronic form.

9. The method recited in claim 7, further comprising:
   transmitting a public key portion of the role certificate by the role member to the entity;
   encrypting information by the entity;
   transmitting the information to any of the plurality of role members of the group; and
   decrypting the information by any of the plurality of role members of the group having the role certificate.

10. The method recited in claim 9, wherein the role certificate comprises a public key, a private key, a signature algorithm ID, a validity period, extensions, and at least one policy, wherein the extensions indicate that the role certificate may be used for both encryption and as a digital signature.

11. A method of replacing an expiring role certificate, comprising:
   displaying a list of roles to a user who is either a role member or a role administrator;
   wherein the user is a member of a group authorized to utilize the role certificate as a group stamp and for encryption of information which may be decrypted by a plurality of group members;
   selecting a role which is about to expire for renewal by the user;
   determining if the user is authorized to renew the role based upon verification of the user's personal digital signature;
   generating a new role certificate having a private and public key; and
   transmitting the new role certificate to the user.

12. The method recited in claim 11, the transmitting of the new role certificate to the user is done over an encrypted secure communications line.

13. The method recited in claim 11, wherein prior to the transmitting of the new role certificate to the user, the new role certificate is transmitted to a certificate authority for approvals and the new role certificate is not transmitted to the user without the approval.

14. The method recited in claim 13, wherein the public key portion of the role certificate is stored on a server for access by individuals and entities outside of the group.

15. The method recited in claim 14, wherein the private key portion of the role certificate is stored in a key recovery authority for recovery in case of loss or expiration.

16. The method recited in claim 11, wherein the role certificate comprises a public key, a private key, a signature algorithm ID, a validity period, extensions, and at least one policy.

17. A method of revoking a role certificate used as an organizational stamp and for organizational encryption by authorized members of the organization, comprising:
transmitting a signature certificate to a registration web server by a user, wherein the user is a member of a group authorized to utilize the role certificate as a group stamp and for encryption of information which may be decrypted by a plurality of group members;
authenticating by accessing a directory that the user is still a member of the organization;
listing roles of which the user is a role member or a role authority; and
removing the role certificate associated with the role from a directory database.

18. The method recited in claim 17, wherein when the role certificate is removed from the directory database the role associated with the role certificate remains intact on the database.

19. The method recited in claim 18, further comprising:
generating a new role certificate for the role when the role certificate is removed from the directory database;
establishing a secure encrypted communications line with the user; and
transmitting the role certificate to the user.

20. The method recited in claim 19, further comprising:
notifying all role members associated with the role of the removal of the role certificate and the creation of the new role certificate when the new role certificate is created.

21. The method recited in claim 17, wherein the role certificate comprises a public key, a private key, a signature algorithm ID, a validity period, extensions, and at least one policy.

22. A method of recovery of an expired role certificate associated with the role used for organizational encryption and as an organizational stamp, comprising:
transmitting a request to recover the expired role certificate along with a digital signature from a role member, wherein a role member is an entity having a right to digitally sign organizational documents using the role certificate and decrypting information sent to members of the organization which has been encrypted using the role certificate;
listing all roles that the role member is listed as a role member on;
selecting the expired role certificate from the list of roles by the role member for recovery;
contacting a key recovery authority for a copy of the role certificate; and
transmitting the role certificate to the role member.

23. The method recited in claim 22, further comprising:
authenticating that the role member is either a member of the role or a role authority for the role prior to contacting the key recovery authority.

24. The method recited in claim 22, wherein the role certificate comprises a public key, a private key, a signature algorithm ID, a validity period, extensions, and at least one policy.

25. The method recited in claim 23, wherein all members of the role are informed of the recovery of the role certificate.

26. A method of revoking a role certificate and an associated role by a role administrator, comprising:
transmitting a request to revoke the role certificate of a role member and the associated role by the role administrator for the role certificate along with a signature certificate for the role administrator, wherein the role member is a member of a group authorized to utilize the role certificate as a group stamp and for encryption of information which may be decrypted by a plurality of group members;
searching a database for all role certificates in which the role administrator is listed as a role administrator;
displaying to the role administrator all role certificates discovered;
selecting a role certificate by the role administrator to be removed; and
deleting both the role certificate and the role from the database.

27. The method recited in claim 26, wherein a policy is deleted from a directory when the role certificate and a role are deleted from the database.

28. The method recited in claim 27, wherein the role certificate comprises a public key, a private key, a signature algorithm ID, a validity period, extensions, and at least one policy.

29. A method of recovering a former role and an associated role certificate by a role administrator, comprising:
identifying a role certificate to be recovered;
searching a database to determine if any role members associated with the role certificate are still in the organization, wherein each of the role members are members of a group authorized to utilize the role certificate as a group stamp and for encryption of information which may be decrypted by a plurality of group members;
transmitting to at least one recovery agent a request for approval for the recovering of the role certificate when no role members are discovered to be in the organization;
receiving approval from the at least one recovery agent for recovery of the role certificate;
transmitting to the at least one recovery agent the role certificate retrieved when the recovery agent supplies an approval to recover the role certificate; and
transmitting the role certificate to the role administrator by the recovery agent.

30. The method recited in claim 29, wherein the at least one recovery agent is at least two recovery agents and both recovery agents must approve recovery before recovery of the role certificate occurs.

31. The method recited in claim 30, wherein both recovery agents must be authenticated as having authority to authorize the recovery of the role certificate prior to the role certificate being sent to the recovery agent.

32. A computer program embodied on a computer readable medium and executable by a computer to create a role certificate for a user, comprising:
transmitting a role approval form filled out and digitally signed by the user using a personal digital signature to at least one personal role approval, wherein the user is a member of a group authorized to utilize the role certificate as a group stamp and for encryption of information which may be decrypted by a plurality of group members;

signing digitally the role approval form by the personal role approval using a personal digital signature;

creating a role certificate upon receipt of the role approval form signed by the user and all personal role approval;

notifying the user of the availability of the role certificate; and transmitting the role certificate to the user.

33. The computer program recited in claim 32, wherein the role certificate comprises a public key, a private key, a signature algorithm ID, a validity period, extensions, and at least one policy.

34. The computer program recited in claim 33, wherein the policy indicates all permitted uses and limitations on the role certificate.

35. The computer program recited in claim 34, further comprising:

identifying all members of a group as role members that will access and use of the role certificate;

storing the names and identifications of all role members; and transmitting copies of the role certificate to all role members.

36. The computer program recited in claim 35, further comprising:

transmitting the public key portion of the role certificate to a plurality of entities outside the group; and decrypting messages from the plurality of entities outside the group encrypted using the public key portion of the role certificate.

37. The computer program recited in claim 35, further comprising:

signing electronic forms by a group member utilizing the role certificate; and transmitting electronic forms to entities outside the group.

38. A computer program embodied on a computer readable medium and executable by a computer for using a role certificate as an organizational stamp and for organizational encryption by a plurality of role members of a group, comprising:

filling out an electronic form by a role member of the plurality of role members of the group, wherein the role member is a member of a group authorized to utilize the role certificate as a group stamp and for encryption of information which may be decrypted by a plurality of group members;

signing digitally the electronic form by the role member using the role certificate;

signing digitally the electronic form by the role member using a personal signature certificate; and transmitting the electronic form to an entity.

39. The computer program recited in claim 38, further comprising:

retrieving a policy associated with the role certificate by the entity; and determining if the role certificate signature supplied is valid as a signature for the electronic form.

40. The computer program recited in claim 38, further comprising:

transmitting a public key portion of the role certificate by the role member to the entity;

encrypting information by the entity;

transmitting the information to any of the plurality of role members of the group; and decrypting the information by any of the plurality of role members of the group having the role certificate.

41. The computer program recited in claim 40, wherein the role certificate comprises a public key, a private key, a signature algorithm ID, a validity period, extensions, and at least one policy, wherein the extensions indicate that the role certificate may be used for both encryption and as a digital signature.

42. A computer program embodied on a computer readable medium and executable by a computer for replacing an expiring role certificate, comprising:

displaying a list of roles to a user who is either a role member of or a role administrator, wherein the user is a member of a group authorized to utilize the role certificate as a group stamp and for encryption of information which may be decrypted by a plurality of group members;

selecting a role which is about to expire for renewal by the user;

determining if the user is authorized to renew the role based upon verification of the user's personal digital signature;

generating a new role certificate having a private and public key; and transmitting the new role certificate to the user.

43. The computer program recited in claim 42, the transmitting of the new role certificate to the user is done over an encrypted secure communications line.

44. The computer program recited in claim 42, wherein prior to the transmitting of the new role certificate to the user, the new role certificate is transmitted to a certificate authority for approval, and the new role certificate is not transmitted to the user without the approval.

45. The computer program recited in claim 44, wherein the public key portion of the role certificate is stored on a server for access by individuals and entities outside of the group.

46. The computer program recited in claim 45, wherein the private key portion of the role certificate is stored in a key recovery authority for recovery in case of loss or expiration.

47. The computer program recited in claim 46, wherein the role certificate comprises a public key, a private key, a signature algorithm ID, a validity period, extensions, and at least one policy.

48. A computer program embodied on a computer readable medium and executable by a computer for revoking a role certificate used as an organizational stamp and for organizational encryption by authorized members of the organization, comprising:

transmitting a signature certificate to a registration web server by a user, wherein the user is a member of a group authorized to utilize the role certificate as a group stamp and for encryption of information which may be decrypted by a plurality of group members;

authenticating by accessing a directory that the user is still a member of the organization;

listing roles of which the user is a role member or a role authority; and removing the role certificate associated with the role from a directory database.

49. The computer program recited in claim 48, wherein when the role certificate is removed from the directory database the role associated with the role certificate remains intact on the database.

50. The computer program recited in claim 49, further comprising:

generating a new role certificate for the role when the role certificate is removed from the directory database;

establishing a secure encrypted communications line with the user; and transmitting the role certificate to the user.

51. The computer program recited in claim 50, further comprising:
   notifying all role members associated with the role of the removal of the role certificate and the creation of the new role certificate when the new role certificate is created.

52. The computer program recited in claim 49, wherein the role certificate comprises a public key, a private key, a signature algorithm ID, a validity period, extensions, and at least one policy.

53. A computer program embodied on the computer readable medium and executable by computer for recovery of an expired role certificate associated with the role used for organizational encryption and as an organizational stamp, comprising:
   transmitting a request to recover the expired role certificate along with a digital signature from a role member, wherein a role member is an entity having a right to digitally signed organizational documents using the role certificate and decrypting information sent to members of the organization which have been encrypted using the role certificate;
   listing all roles that the role member is listed as a role member on;
   selecting the expired role certificate from the list of roles by the role member for recovery;
   contacting a key recovery authority for a copy of the role certificate; and
   transmitting the role certificate to the role user.

54. The computer program recited in claim 53, further comprising:
   authenticating that the role member is either a member of the role or a role authority for the role prior to contacting the key recovery authority.

55. The computer program recited in claim 53, wherein the role certificate comprises a public key, a private key, a signature algorithm ID, a validity period, extensions, and at least one policy.

56. The computer program recited in claim 54, wherein all members of the role are informed of the recovery of the role certificate.

57. A computer program embodied on a computer readable medium and executable by a computer for revoking a role certificate and an associated role by a role administrator, comprising:
   transmitting a request to revoke the role certificate of a role member and the associated role by the role administrator for the role certificate along with a signature certificate for the role administrator, wherein the user is a member of a group authorized to utilize the role certificate as a group stamp and for encryption of information which may be decrypted by a plurality of group members;
   searching a database for all role certificates in which the role administrator is listed as a role administrator;
   displaying to the role administrator all role certificate discovered;
   selecting a role certificate by the role administrator to be removed; and
   deleting both the role certificate and the role from the database.

58. The computer program recited in claim 57, wherein a policy is deleted from a directory when the role certificate and a role are deleted from the database.

59. The computer program recited in claim 58, wherein the role certificate comprises a public key, a private key, a signature algorithm ID, a validity period, extensions, and at least one policy.

60. A computer program embodied on a computer readable medium and executable by a computer for recovering a former role and an associated role certificate by a role administrator, comprising:
   identifying a role certificate to be recovered;
   searching a database to determine if any role members associated with the role certificate are still with the organization, wherein the each of the role members are members of a group authorized to utilize the role certificate as a group stamp and for encryption of information which may be decrypted by a plurality of group members;
   transmitting to at least one recovery agent a request for approval for the recovering of the role certificate;
   receiving approval from the at least one recovery agent for recovery of the role certificate;
   transmitting to the at least one recovery agent the role certificate retrieved; and
   transmitting the role certificate to the role administrator by the recovery agent.

61. The computer program recited in claim 60, wherein the at least one recovery agent is at least two recovery agents and both recovery agents must approve recovery before recovery of the role certificate occurs.

62. The computer program recited in claim 61, wherein both recovery agents must be authenticated as having authority to authorize the recovery of the role certificate prior to the role certificate being sent to the recovery agent.

63. A role certificate for organizational encryption and for use as an organizational stamp or seal, comprising:
   a public key to be transmitted to entities outside the organization to use as an encryption key;
   a private key to decrypt information encrypted using the public key;
   a signature algorithm ID to be used in generating a digital signature with the role certificate;
   a validity period indicating when the role certificate will expire;
   extensions having a plurality of bits which designate characteristics associated with the role certificate, wherein when a bit for encryption is set and a bit for signature is set, the role certificate may be used for both digital signatures and encryption; and
   a policy defining the limitations on valid usage of the role certificate.

64. The role certificate recited in claim 63, wherein the role certificate may be used by any member authorized within the organization for decrypting encrypted information and signing on behalf of the organization.

65. The role certificate recited in claim 63, wherein the role certificate is created by a role authority and deleted by the member of the organization designated as a role member for the role certificate, wherein an associated role for the role certificate may not be deleted by the role member.

66. The role certificate recited in claim 64, wherein any time that the role certificate is used to sign on behalf of the organization, a signature certificate for the entity signing must be included.

* * * * *